United States Patent [19]
Kojima et al.

[11] Patent Number: 5,458,673
[45] Date of Patent: Oct. 17, 1995

[54] EXHAUST GAS PARTICULATE PURIFYING PROCESS FOR INTERNAL COMBUSTION ENGINE

[75] Inventors: Akikazu Kojima, Gamagoori; Mitsuo Inagaki, Okazaki; Shinji Miyoshi, Okazaki; Fumiaki Arikawa, Okazaki; Takayuki Takeuchi, Gamagoori, all of Japan

[73] Assignee: Nippon Soken, Inc., Nishio, Japan

[21] Appl. No.: 157,474

[22] Filed: Nov. 26, 1993

[30] Foreign Application Priority Data

Nov. 26, 1992 [JP] Japan .................................. 4-316871
Nov. 26, 1992 [JP] Japan .................................. 4-317146

[51] Int. Cl.⁶ .................................................. B01D 29/66
[52] U.S. Cl. .................................. 95/11; 55/283; 55/288; 55/314; 55/385.3; 55/DIG. 30; 60/274; 95/19; 95/21; 95/279; 95/283; 96/144; 123/198 E
[58] Field of Search .................................. 95/11, 19–21, 95/279, 283; 96/146, 143, 144; 55/288, 283, 385.3, 523, DIG. 30, 309, 312, 314, 267; 219/205; 123/198 E; 60/286, 288, 300, 274

[56] References Cited

U.S. PATENT DOCUMENTS

| | | | |
|---|---|---|---|
| 4,276,066 | 6/1981 | Bly et al. | 55/288 X |
| 4,427,418 | 1/1984 | Kogiso et al. | 55/DIG. 30 |
| 4,544,388 | 10/1985 | Rao et al. | 55/288 X |
| 4,851,015 | 7/1989 | Wagner et al. | 95/279 X |
| 4,897,096 | 1/1990 | Pischinger et al. | 55/DIG. 30 |
| 4,923,484 | 5/1990 | Saito | 95/20 |
| 5,090,200 | 2/1992 | Arai | 55/DIG. 30 |
| 5,105,619 | 4/1992 | Arai | 55/DIG. 30 |
| 5,212,948 | 5/1993 | Gillingham et al. | 55/DIG. 30 |
| 5,305,602 | 4/1994 | Kojima et al. | 55/283 X |

FOREIGN PATENT DOCUMENTS

| | | |
|---|---|---|
| 3-43524 | 4/1991 | Japan . |
| 3-118215 | 12/1991 | Japan . |
| 3-118216 | 12/1991 | Japan . |

*Primary Examiner*—Richard L. Chiesa
*Attorney, Agent, or Firm*—Cushman, Darby & Cushman

[57] ABSTRACT

For regenerating an exhaust gas particulate collecting filter, there is provided an exhaust gas particulate purifying process in which damage to the filter caused by a thermal action can be prevented and further electric power can be saved when an electric current supply to an electric heater attached to the filter is controlled. In the filter container (4), an electric heater (21) is provided on an end surface of the filter on an upstream side with respect to a regenerating gas flow, or provided at a position close to the end surface. Also, a temperature sensor (22) for measuring a temperature of the filter is provided inside the filter or at a position close to an end surface of the filter opposite to the aforementioned end surface. Further, there is provided a first controller (13) for determining an appropriate current amount to be supplied to the electric heater and also for determined an electric power reducing pattern used in the case of stoppage of power supply, in accordance With the filter preheating temperature immediately before the start of regeneration detected by the temperature sensor (22). A second controller (17) controls a current amount supplied to the electric heater (21) in accordance with a command given by the first controller (13).

3 Claims, 17 Drawing Sheets

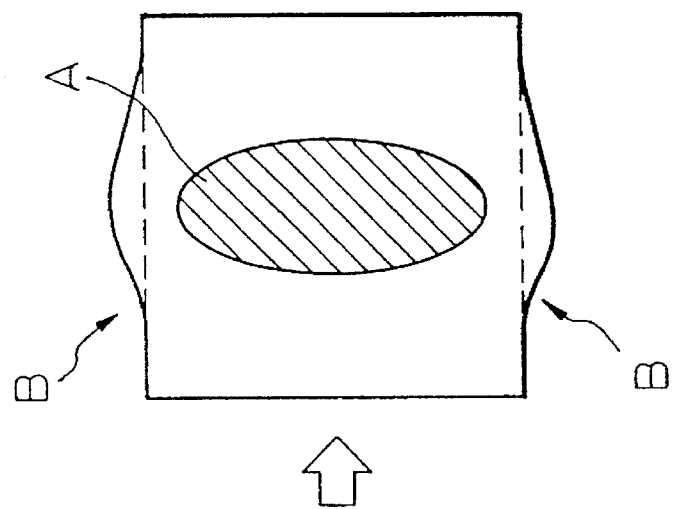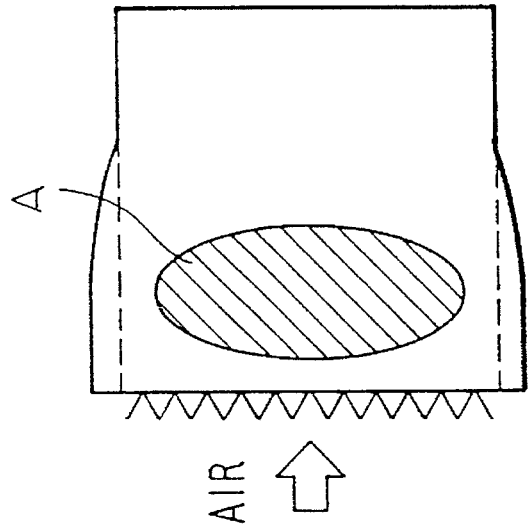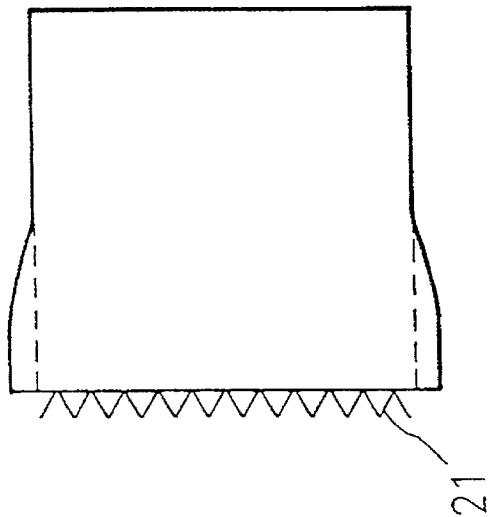

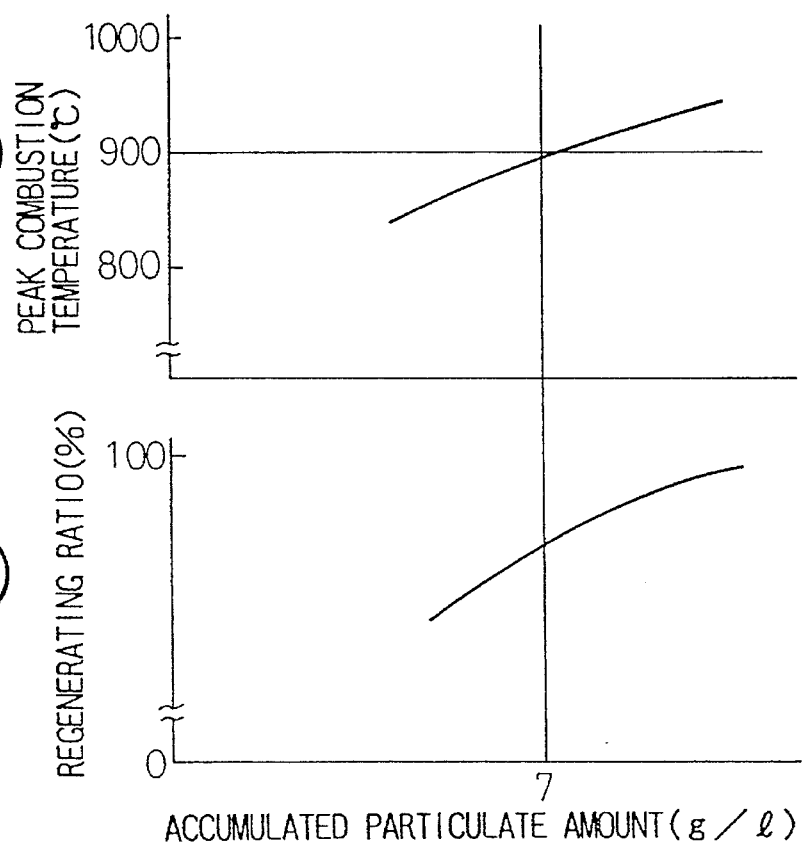

① ··· FROM THE HEATER SURFACE 30 mm
② ··· FROM THE HEATER SURFACE 65 mm
③ ··· FROM THE HEATER SURFACE 100 mm

TO THE CONTROL UNIT

Fig.20(A)
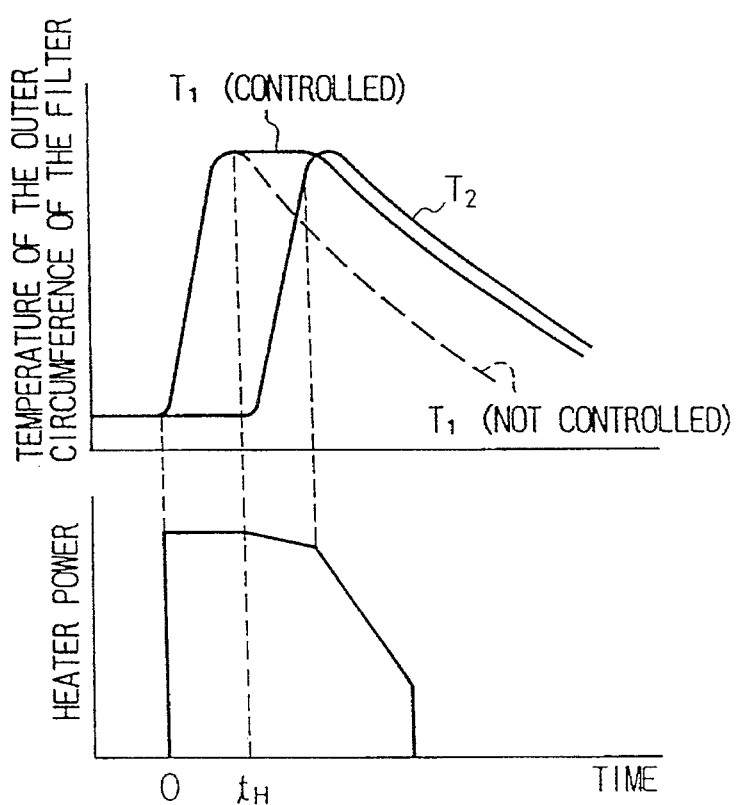
Fig.20(B)
Fig.21
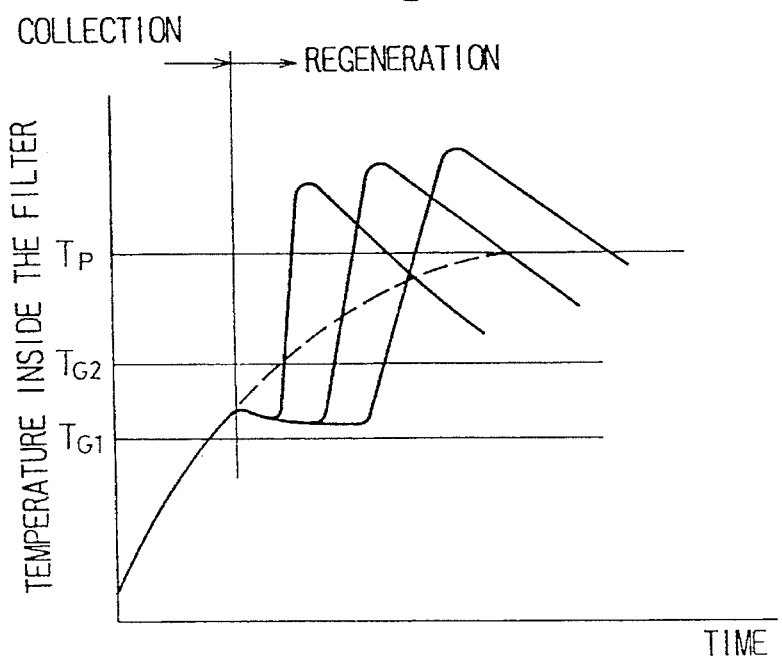

EXHAUST GAS PARTICULATE PURIFYING PROCESS FOR INTERNAL COMBUSTION ENGINE

BACKGROUND OF THE INVENTION

1. Field of the Invention

The present invention relates to an exhaust gas particulate purifying apparatus provided with a filter to purify exhaust gas by separating and collecting particulates contained in the exhaust gas discharged from an internal combustion engine such as a diesel engine.

2. Description of the Related Art

For example, a large amount of combustible particulates such as carbon particles are contained in the exhaust gas of a diesel engine. Therefore, a particulate filter (referred to as a filter, hereinafter) to collect the particulates is attached to an exhaust gas system of the diesel engine.

For example, this filter is made of a ceramic which is heat-resistant and porous so as to provide the property of gas permeability. As the operating time of an engine is increases, an amount of particulates accumulated in the filter also increases, and then the ventilation resistance gradually increases. As a result, output of the engine is reduced. For this reason, it is necessary to periodically regenerate the filter in accordance with the amount of collected particulates.

A process of regenerating the filter starts when the accumulated particulates are heated by a heating means to a temperature not less than the ignition temperature (approximately 650°) so as to ignite and burn the accumulated particulates. An electric heater or a kerosine burner may be used as the heating means. In FIG. 1, an example of the exhaust gas particulate purifying apparatus is shown, in which an electric heater 21 is attached to a filter 20. The filter 20 is provided with a bypass 9. Accordingly, in the regenerating process, all exhaust gas flows through the bypass 9 by the action of a changeover valve 3 as shown in the drawing.

Air used for regeneration processing is supplied to the filter 20 from one end of the filter 20. In this example, the air used for regeneration processing is supplied in the same direction as that of the flow of exhaust gas in the case of particulate collection. When the electric heater 21 which is disposed along an upstream end surface of the filter 20 with respect to the regenerating air flow, or embedded inside the end surface, is energized with current the particulates accumulated in the filter 20 are heated and ignited from the upstream side, so that they are burnt and incinerated in the air sent from an air pump 12.

In this connection, according to the experiments made by the inventors, an accumulated particulate amount and a peak combustion temperature were strongly correlated. That is, the more accumulated particulates were available, the higher the peak combustion temperature, and it was found that the filter cracked when the temperature was raised to a value exceeding 900° C. FIG. 3 is a view showing the inside of a cracked filter. As shown in the drawing, cracks C were caused at a position in the filter separated from the end surfaces of the heater by 30 mm in such a manner that the cracks were directed from the outer circumference to the inside of the filter. The diameter of the filter was 140 mm, the length was 130 mm, and the volume was 2 l.

As illustrated in FIG. 4, the cracks C were caused in the following manner:

(a) First, when the heater is energized with current, a portion close to the heater is heated to a high temperature and expanded.

(b) After that, the particulates located close the heater are ignited and a combustion region A is formed. Therefore, a portion of the filter on the downstream side with respect to the heater end surface is expanded.

(c) After that, the current supply to the heater is stopped. Then, the combustion region A is moved to the downstream side by the influence of an air flow for regenerating, so that a portion of the filter close to the combustion region A is expanded. However, a portion of the filter close to the heater is cooled by the regenerating air at normal temperature, so that the portion shrinks. Due to the expansion and shrinkage, an extremely high thermal stress is generated in an arrowed portion B of the filter, so that the filter is imaged.

The inventors found the above phenomenon. The more the accumulated particulate amount was increased, the more the filter was cracked. The reason is described as follows: The more accumulated particulates are available the higher the calorific value, the higher the temperature is raised. Accordingly, the amount of expansion in the combustion region A is large. On the other hand, air cooling is always conducted to the same degree. Therefore, the temperature gradient between the cooled portion and the combustion region A is increased. As a result, a high thermal stress is generated, and the filter is imaged.

In FIG. 5, it is shown that a relationship exists between the accumulated particulate amount and the regenerating ratio, and also that a relationship exists between the peak combustion temperature and the regenerating ratio in the case where the temperature immediately before the filter is regenerated is approximately the same as the room temperature. The temperature immediately before the filter is regenerated will be referred to as "filter preheating temperature", hereinafter. In this example, the filter is made of cordierite the volume of which is 2 l.

As a result, the following was found:

In order to prevent the occurrence of thermal damages such as cracks on the filter, it is necessary to maintain the peak temperature at less than about 900° C., so that an amount of particulates accumulated in the filter must be not more than about 7 g/l. On the other hand, the regenerating ratio, which represents how much accumulated particulate is burnt and removed, is strongly correlated with the accumulated particulate amount, and the higher the accumulated particulate amount is, the higher the regenerating ratio. When unburnt particulates are left in the filter in a regenerating process, a pressure loss condition continues over a long period of time in the filter, which is disadvantageous from the view points of fuel consumption and of output from the engine. Further, in the next regenerating process, the unburnt particulates affect the regenerating operation, and there is a high possibility that a malfunction is caused and that the temperature is raised to an abnormally high value. For this reason, the amount of unburnt particulates are preferably small, that is, the regenerating ratio is preferably high. Consequently, in order to provide a high regenerating ratio at a temperature of not more than 900° C., the amount of particulates to be regenerated must be 7 (g/l).

However, actual vehicle operating conditions vary from a high speed and heavy load operation on an uphill road, to a low speed and light load operation in a city area where traffic is congested. Therefore, the exhaust gas temperature varies greatly. Accordingly, the temperature inside the filter at a time when the regenerating processing is started, which will be referred to as "filter preheating temperature" hereinafter, varies in a range from 50° C. to 700° C. For this reason, it is assumed that the regenerating properties are also changed. FIG. 6 is a diagram showing the result of an experiment made by the inventors, in which the transition of temperature at a position close the heater inside the filter is illustrated in the case where the electric heater was energized with current under the condition that the filter preheating temperatures were 60° C. and 400° C. Usually, the heater energizing time $t_y$ is determined so that the accumulated particulates can be positively ignited even when the filter preheating temperature is low. Therefore, in the case of the curve I in which the filter preheating temperature is 60° C., the temperature inside the filter is maintained to be approximately 800° C. However, in the case of the curve II in which the filter preheating temperature is 400° C., the temperature is approximately raised to 1000° C. which exceeds the limit of occurrence of cracks.

That is, the first problem is described as follows. An extremely high thermal stress is generated between a cooled portion and a combustion area so that thermal damage is caused when the portion close to the heater end surface is cooled in the case where a current supply to the heater has been stopped. Then, the second problem is described as follows. When the filter preheating temperature is high, the heater is energized with an excessive amount of current, so that thermal damage is also caused.

FIG. 7 contains diagrams showing the result of an experiment in which the influence of filter preheating temperature was investigated in the regenerating process. In the diagrams in FIG. 7, the horizontal axis represents the preheating temperature, and the vertical axis represents the peak combustion temperature under the condition that the accumulated particulate amount is maintained at a constant value of 7 (g/l). From a preheating temperature of room temperature, the peak combustion temperature was approximately 900° C. As the preheating temperature was raised, the peak combustion temperature was also raised and exceeded the temperature at which the filter was cracked.

That is, an accumulated particulate amount to be adopted as a target in the regenerating process, must be determined to be a value at which a high regenerating ratio can be provided at the lowest preheating temperature to be estimated. However, in actual vehicle operating conditions, the range of the preheating temperature is so wide that the preheating temperature is raised high. When the regenerating processing is performed under the aforesaid condition, the calorific power becomes too high. As a result, the filter is cracked as described before. For example, the aforesaid case occurs in the following manner:

Under the condition of an accumulated particulate amount which is a little smaller than a target value, a vehicle is operated at high speed under a heavy load, so that the particulates are accumulated while the filter preheating temperature is maintained high, and a regenerating processing time has arrived under the aforesaid condition.

In order to solve the above problems, when the preheating temperature is high, air for use in regenerating processing may be supplied so as to lower the temperature, and after the filter has been cooled, the regenerating processing may be conducted. However, when the aforesaid means is employed, exhaust gas containing particulates is discharged through a bypass, so that the exhaust gas emission is deteriorated.

SUMMARY OF THE INVENTION

Consequently, in view of the aforesaid problems of the prior art, the first object of the present invention is to provide an exhaust gas particulate purifying apparatus in which the damage to a filter for collecting particulates, caused by heat can be prevented and electric power can be saved when a current energizing an electric heater attached to the filter is controlled in a regenerating process of the filter.

Further, the second object of the present invention is to provide an exhaust gas particulate purifying apparatus by which an excellent regenerating processing operation can be always conducted without the occurrence of abnormally high temperature and errors of regeneration even when the filter preheating temperature is varied.

In order to accomplish the aforesaid first object of the present invention, as a first embodiment of the present invention, an exhaust gas particulate purifying apparatus is provided, which comprises: a filter provided in an internal combustion engine so as to collect particulates contained in exhaust gas; an electric heater provided on an end surface of said filter or in a position close to said end surface, said end surface being located on an upstream side of said filter with respect to a flowing direction of regenerating gas in a regenerating process; a temperature measuring means provided close to an end surface of said filter, said end surface being located on a downstream side of said filter with respect to a flowing direction of regenerating gas in a particulate collecting process; a control means for determining an appropriate amount of current to be supplied to said electric heater in accordance with the filter preheating temperature detected by said temperature measuring means and also in accordance with the period in which a current is supplied; and a current amount control means for controlling a current sent to said electric heater in accordance with a command from said control means.

In the above embodiment of the present invention, after the filter has collected particulates, it is subjected to a regenerating processing. At this time, a current is made to flow to the electric heater provided on an end surface of the filter located on an upstream side with respect to the direction of a flow of regenerating gas, and then the collected particulates are heated and burnt. In this case, the current energizing pattern is appropriately determined in the following manner:

After a period of time in which a current is made to flow for heating and burning, has passed, the amount of current is reduced stepwise or continuously, and further the amount of a reduced current is determined by the control means in accordance with the filter preheating temperature detected by the temperature measuring means provided in the filter or close to an end surface of the filter. In accordance with a command of the control means, the current amount control means starts supplying a current to the electric heater, and stops supplying the current according to a command.

By the aforesaid operation, it is possible to prevent the temperature at a position close to the heater from being suddenly lowered. Therefore, the temperature gradient between a heated portion and a combustion region can be reduced, so that the damage of the filter caused by a thermal action can be prevented.

Even when the filter preheating temperature is high, the filter is not heated to a temperature higher than an appropriate value. Accordingly, the damage to the filter caused by heat can be prevented, and further, electric power can be saved.

In order to accomplish the aforesaid second object of the present invention, as a second embodiment of the present invention, an exhaust gas particulate purifying apparatus for an internal combustion engine is provided, which comprises: a filter provided in the internal combustion engine so as to collect particulates contained in exhaust gas; a heating means provided on an end surface of said filter or in a position close to said end surface, said end surface being located on an upstream side of said filter with respect to a flowing direction of regenerating gas in a regenerating process of said filter; a temperature measuring means for measuring the temperature of said filter, being provided in said filter or at a position close to an end surface of said filter; an accumulated particulate amount detection means for detecting an accumulated particulate amount of said filter; and a control means for determining a regenerating processing operation from the filter preheating temperature detected by said temperature measuring means and the accumulated particulate amount detected by said accumulated particulate detection means.

In the second embodiment of the present invention, according to an experiment made by the inventors, the following were found:

In the case where the accumulated particulate amount and the filter preheating temperature were changed, the range in which an excellent regenerating operation was performed at a peak combustion temperature not more than 900° C. and at a weight regenerating ratio not less than 70%, existed in a hatched region shown in FIG. 8, wherein the weight regenerating ratio is defined as a ratio of an amount (weight percent) of burnt and removed particulates, to an amount (weight percent) of accumulated particulates. In other words, even when a particulate amount is smaller than a target accumulated particulate amount (for example, about 7 g/l), an excellent regenerating operation can be performed as long as the preheating temperature is high.

Consequently, according to the obtained knowledge, in order to solve the aforesaid problems, as a second embodiment of the present invention, an exhaust gas particulate purifying apparatus is provided, which comprises: a filter provided in an internal combustion engine so as to collect particulates contained in exhaust gas; a heating means such as an electric heater provided on an end surface of said filter or in a position close to said end surface, said end surface being located on an upstream side of said filter with respect to a flowing direction of regenerating gas in a regenerating process; a temperature measuring means for measuring the temperature of said filter, being provided in said filter or at a position close to an end surface of said filter on the upstream or the downstream side of said filter with respect to the flow direction of regenerating gas; an accumulated particulate amount detection means for detecting an accumulated particulate amount of said filter; and a control means for determining a regenerating processing operation from the filter preheating temperature detected by said temperature measuring means and the accumulated particulate amount detected by said accumulated particulate detection means.

That is, in this embodiment, an accumulated particulate amount is estimated from a pressure difference between the front and the rear of the filter, and further the preheating temperature of the filter is detected by the temperature measuring means provided in the filter, or provided on the end surface of the filter on the upstream or the downstream side with respect to a flow direction of regenerating gas. It is judged from these signals whether or not an excellent regenerating processing operation can be performed. When it is judged that the conditions are in a region for a preferable regenerating operation, a regenerating operation is carried out.

In other words, according to the embodiment of the present invention, a specific accumulated particulate amount to be a target is not provided in particular, and when the filter preheating temperature is in a preferable range of regenerating processing at each particulate accumulation amount, the regenerating processing operation is carried out. Therefore, the regenerating processing operation can be always carried out in a preferable regenerating region. Accordingly, the damage of the filter caused by a thermal action can be avoided.

Depending on a condition, it is possible to perform a regenerating operation when the accumulated particulate amount is small. Accordingly, as compared with a conventional method in which the regenerating processing operation is performed after the accumulated particulate amount has reached a target value, a pressure loss of the filter is small. Therefore, it can be expected that a decline in output of an internal combustion engine can be avoided.

BRIEF DESCRIPTION OF THE DRAWINGS

FIGS. 4(A) 4(B) and 4(C) are views showing a model of the mechanism by which cracks are caused.

FIGS. 5(A) and 5(B) are graphs showing the results of measurement of a peak combustion temperature and regenerating ratio with respect to an accumulated particulate amount.

FIGS. 20(A) and 20(B) are graphs specifically exemplifying the control procedure and effect of the third example.

FIG. 21 is a graph specifically exemplifying an operation conducted in this example.

DETAILED DESCRIPTION OF THE PREFERRED EMBODIMENTS

With reference to the accompanying drawings, the first and second embodiments of the present invention will be explained in detail as follows.

Example 1

First, the aforesaid first embodiment of the present invention will be described as follows.

Figure 9:
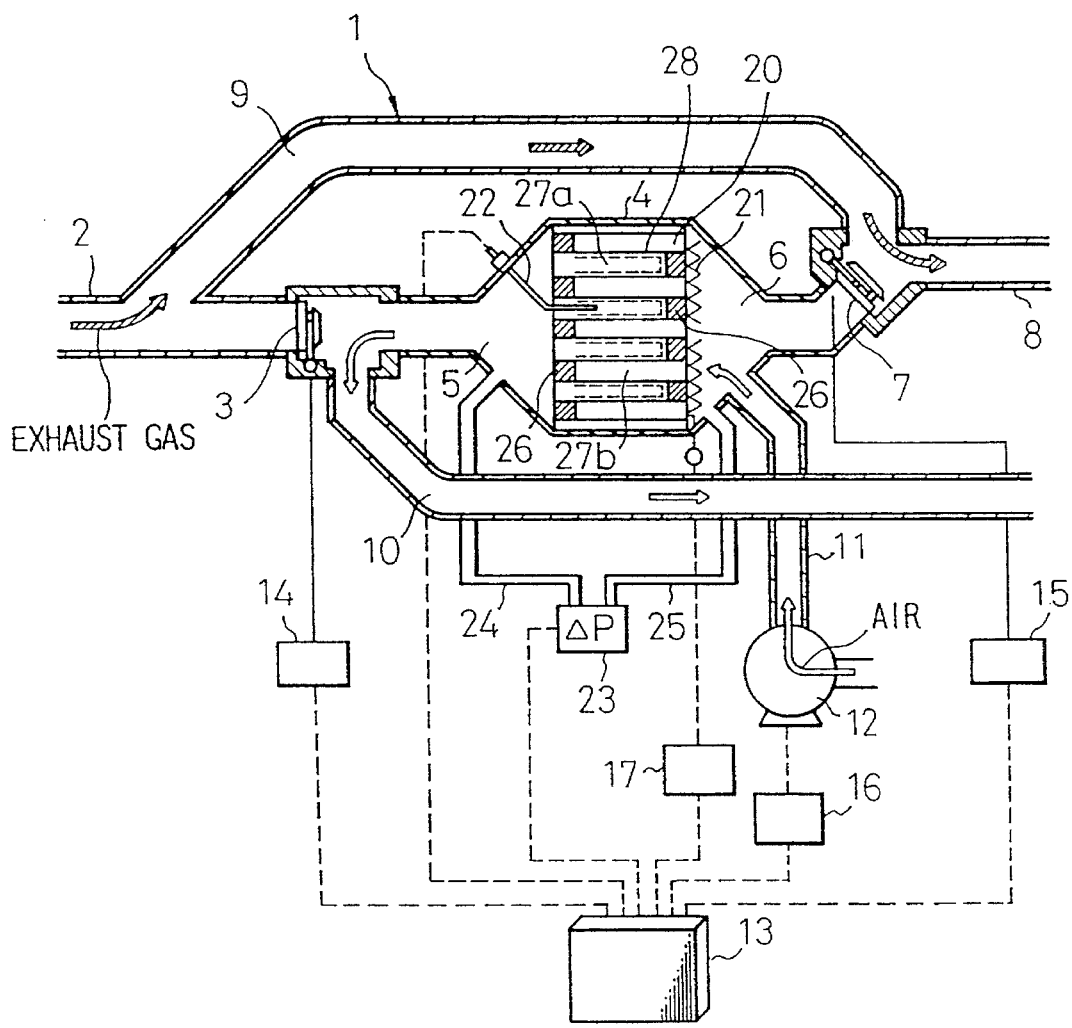
FIG. 9 is an overall arrangement view including a partial section of the apparatus of the first example of the present invention.

FIG. 9 is a conceptional overall arrangement view of an exhaust gas particulate purifying apparatus 1 for diesel engine use including various related devices, which is the first example of the present invention. An exhaust pipe 2 led out from a diesel engine not shown, located in the left portion of FIG. 9, is connected with a filter container 4 through a changeover valve 3. The filter container 4 is approximately cylindrical, and conical spaces 5, 6 are provided at both ends of the filter container 4 in the inlet and outlet portions used for exhaust gas and air. In this case, the exhaust pipe 2 is connected with the space 5. The space 6 is connected with an end exhaust pipe 8 through a changeover valve 7, and the exhaust pipe 8 is vented to the atmosphere through another exhaust gas purifying apparatus not shown in the drawing.

A bypass 9 is provided between the exhaust pipes 2 and 8 so that they can be directly connected. The exhaust pipe 8 is selectively connected with space 6 of the filter container 4 and the bypass 9 by the changeover valve 7. Another exhaust pipe 10 branching from the changeover valve 3 is vented to the atmosphere, when the communication between the exhaust pipe 2 and the space 5 of the filter container 4 is interrupted by the changeover valve 3, the space 5 is vented to the atmosphere by the action of the changeover valve 3. An air pump 12 is connected with the space 6 of the filter container 4 through an air supply pipe 11. Reference numeral 13 is an electronic control unit which is a control means employed for the present invention. The control unit 13 sends control signals to an actuator 14 to activate the changeover valve 3, an actuator 15 to activate the changeover valve 7, an air flow control unit 16 to control the operation of the air pump 12, and a relay 17 used as an example of the energizing current amount control means of the present invention.

A honeycomb-shaped porous ceramic filter 20 to collect particulates contained in exhaust gas, is fixed in the filter container 4 of the exhaust gas particulate purifying apparatus 1 through an appropriate buffer or heat insulator.

An electric heater 21 used as a heating means for igniting the particulates is attached onto an end surface of the filter 20 on the space 6 side. A current supplied to the electric heater 21 is controlled by the relay 17 operated by the control unit 13 as described above.

A temperature sensor 22 used as a temperature measuring means is attached onto a side of the space 5 located on an opposite side to the space 6 in which the electric heater is provided, wherein the aforesaid side of the space 5 becomes the downstream side of a gas flow in the case where a regenerating processing operation of the filter 20 is carried out. A tip of the temperature sensor 22 is inserted into the filter 20 so as to detect the temperature inside the filter 20, and a detected signal is inputted into the electronic control unit 13. In this connection, when it is difficult to insert the detection end of the temperature sensor 22 into the filter 20, the detection end of the sensor 22 may be provided in a portion close to an end surface of the filter 20, wherein the end surface is located on the downstream side of a gas flow in the case where a regenerating processing operation is carried out, and in this case the portion in which the sensor 22 is provided must be a portion, the temperature of which changes in accordance with the temperature inside the filter 20.

When an accumulated particulate amount is measured, a time is determined at which the filter 20 is subjected to a regenerating processing. In order to determine the time, in this example, a pressure difference meter is provided so as to detect a pressure difference between the front and rear of the filter 20, and pressure communicating pipes 24, 25 are connected with the spaces 5, 6 of the filter container 4. Pressure difference signal ΔP detected by the pressure difference meter 23 is inputted into the electronic control unit 13 through a lead wire. In order to correct this pressure difference ΔP, signals of the intake air flow and engine speed are also inputted into the electronic control unit 13.

The filter 20 is cylindrical, and for example, the diameter is 140 mm, the length is 130 mm, and the volume is 2 liters. The filter 20 is formed into a honeycomb structure made of cordierite ceramic in the same manner as that of a conventional filter. A large number of small holes provided in the filter 20 in its axial direction are blocked by plugs 26 at the front or rear ends of the holes, so that the holes do not penetrate the filter. Due to the foregoing, a large number of cells 27 are formed. In this case, a group of cells 27, the openings on the space 5 side of which are not provided with the plugs 26 so that the cells 27 are open to the space 5, and the openings on the space 6 side of which are blocked by the plugs 26, will be referred to as the first cell group 27a, hereinafter. On the contrary, a group of cells 27, the openings on the space 5 side of which are blocked by the plugs 26, and the openings on the space 6 side of which are not blocked by the plugs 26 so that the openings are open to the space 6, will be referred to as the second cell group 27b, hereinafter. Whereas the first cell group 27a is open to the space 5 and the second cell group 27b is open to the space 6, the spaces 5 and 6 are partitioned by porous walls 28 of the cells 27.

The exhaust pipe 2 of the exhaust gas particulate purifying apparatus 1 is connected to a diesel engine not shown, and in a normal condition that the particulates contained in the exhaust gas are collected by the filter, the changeover valves 3, 7 are changed over to positions opposite to those shown in FIG. 9, so that the bypass 9 is blocked by the changeover valve 7 and another exhaust pipe 10 is blocked by the changeover valve 3. Therefore, all exhaust gas that has passed through the exhaust pipe 2 is led into the filter container 4, and the gas portion permeates through a porous partition wall dividing the first and the second cell groups 27a and 27b of the filter 20, and then the permeated gas flows are joined with each other and vented to the atmosphere through the exhaust pipe 8. While the gas portion of the exhaust gas permeates through the filter 20, the particulates, which are minute solid particles contained in the exhaust gas, can not pass through the partition wall interposed between the cell groups. Therefore, the particulates are mainly collected and accumulated by the first cell group 27a.

When an accumulated amount of particulates collected by the filter 20 is increased, the exhaust resistance of the engine is increased, so that the engine output is lowered. Therefore, when a signal of pressure difference ΔP detected by the pressure difference meter 23 exceeds a predetermined value, a regenerating processing operation of the filter 20 is carried out by the action of the electronic control unit 13 to which the pressure difference signal is inputted.

When the regenerating processing operation is carried out, the control unit 13 outputs control signals to the actuators 14, 15, so that the changeover valves 3, 7 are changed over to the positions shown in FIG. 9. Due to the foregoing, the exhaust gas exhausted from the Diesel engine is directly led from the exhaust pipe 2 to the exhaust pipe 8 through the bypass 9, and vented to the atmosphere.

Figure 1:
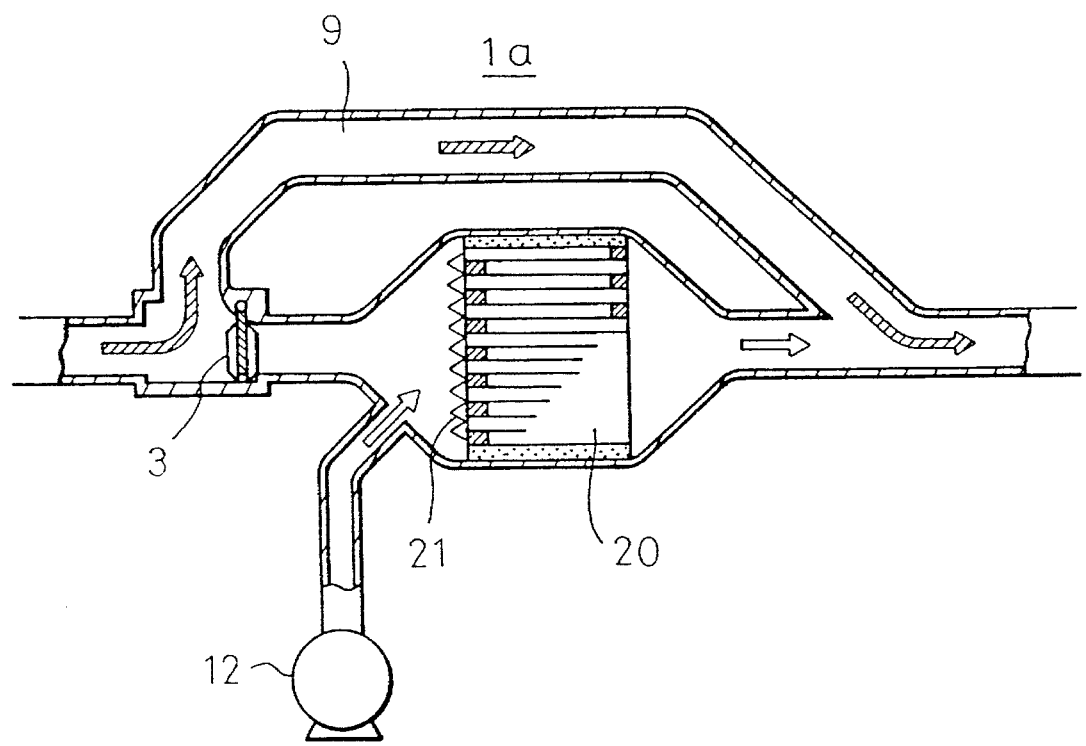
FIG. 1 is a sectional view exemplifying a conventional exhaust gas particulate purifying apparatus.
Figure 2:
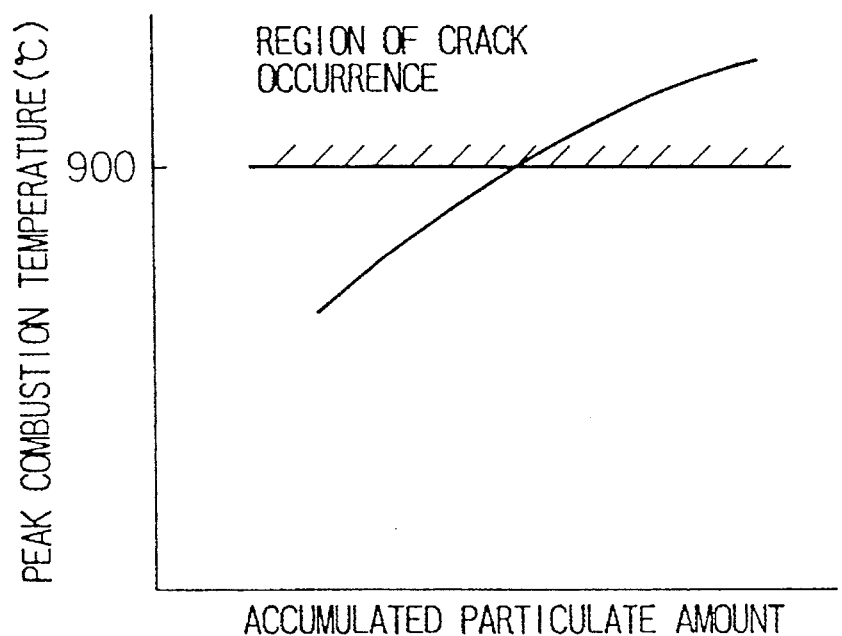
FIG. 2 is a graph showing a relation between an accumulated particulate amount and a peak combustion temperature.
Figure 3A:
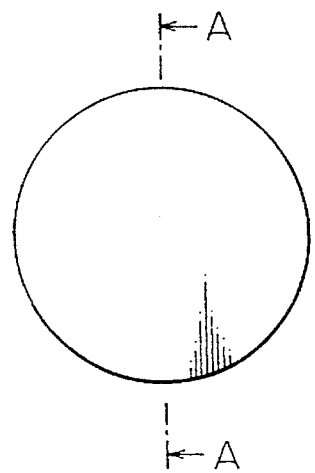
FIGS. 3(A) and 3(B) are views showing the occurrence of cracks.
Figure 3B:
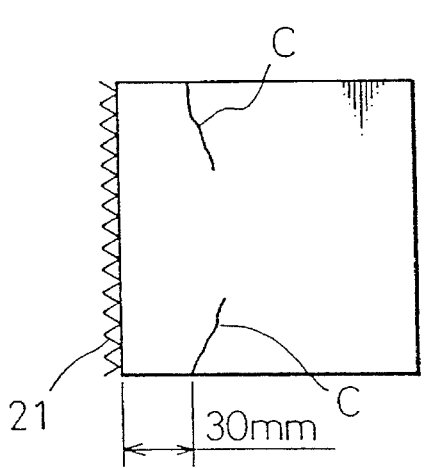

The control unit 13 also outputs a control signal to the relay 17 which is a current amount control means, so that a current flows to the electric heater 21 from a battery not shown in the drawing. Immediately after that, a control signal is also outputted to the air flow amount control unit 16, so that the air pump 12 is driven and gas for regenerating such as air is supplied in a direction indicated by an arrow in FIG. 1. In this connection, in the first example illustrated in FIG. 9, the direction of an exhaust gas flow in the case of regenerating the filter 20 is opposite to that in the case where particulates are collected in a normal operation.

Even in this case, the heat generated by the electric heater 21 can be conveyed by the air flow and supplied to the particulates accumulated in the filter 20 from the upstream side.

The particulates are heated by the electric heater 21, and their temperature is raised to an igniting temperature of 650° C. so that they are burnt, wherein the particulates accumulated on the upstream side are heated and burnt first and then the particulates accumulated on the downstream side are successively heated and burnt. The combustion gas is vented to the atmosphere through another exhaust pipe 10. In this way, the particulates accumulated in the filter 20 are gradually incinerated and removed.

In this case, a sufficient amount of current for igniting the particulates accumulated in the filter may be supplied to the electric heater 21. After the electric heater 21 has been energized, the combustion region is moved to the downstream side by the regenerating air. For this reason, in order to save electric power, for example, in the experiment made by the inventors, the energizing time was only 3 minutes while the regenerating processing operation time was approximately 10 minutes. Consequently, as described above, after the completion of supplying a current to the electric heater 21, the filter 20 is cooled by the air of normal temperature for use in regenerating, so that a temperature gradient between the cooled region and the combustion region is increased, which might damage the filter 20 by a thermal action.

Figure 10:
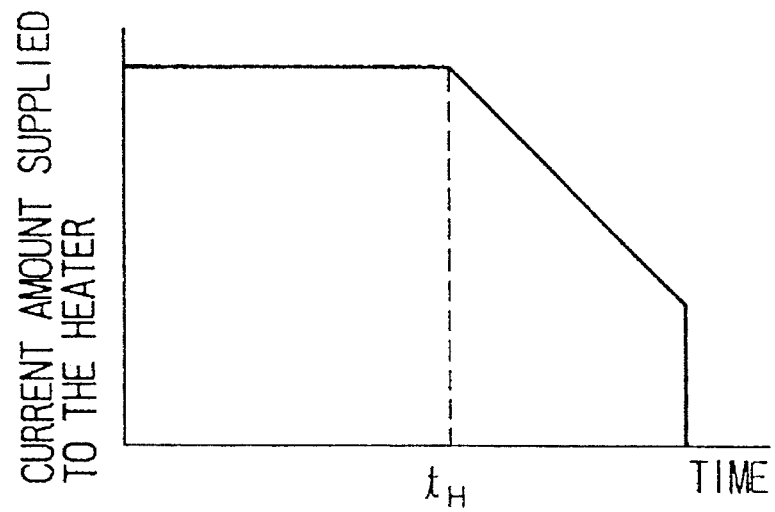
FIG. 10 is a graph specifically exemplifying a control procedure in the first example.

In order to solve the problems, a signal is sent to the current amount control means 17 from the control means 13 so that the current amount can be gradually reduced at the completion time ($t_H$) of energizing the heater as shown in FIG. 10. Due to the foregoing, a portion of the filter 20 close to the electric heater is not suddenly cooled, so that a temperature gradient between the cooled portion and the combustion region can be reduced. Consequently, the filter 20 can be prevented from being damaged by heat.

Figure 6:
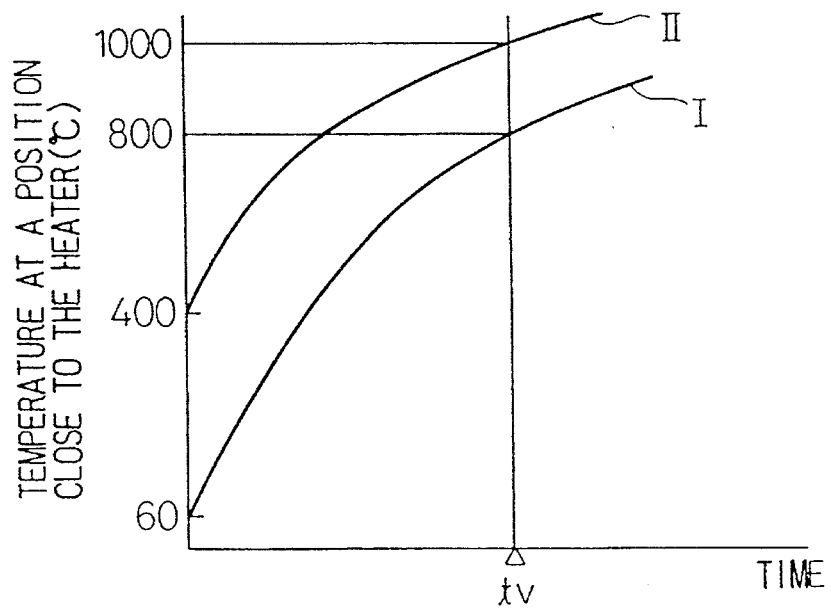
FIG. 6 is a graph showing a change in the temperature at a position close to an electric heater when the filter preheating temperatures are different.
Figure 7A:
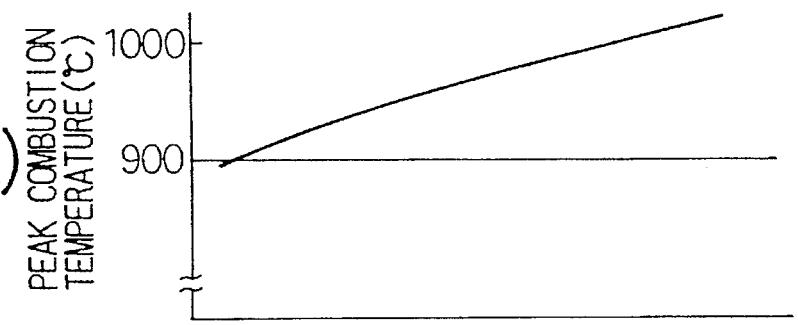
FIGS. 7(A) and 7(B) are graphs showing the result of measurement of a peak combustion temperature and regenerating ratio with respect to the preheating temperature.
Figure 7B:
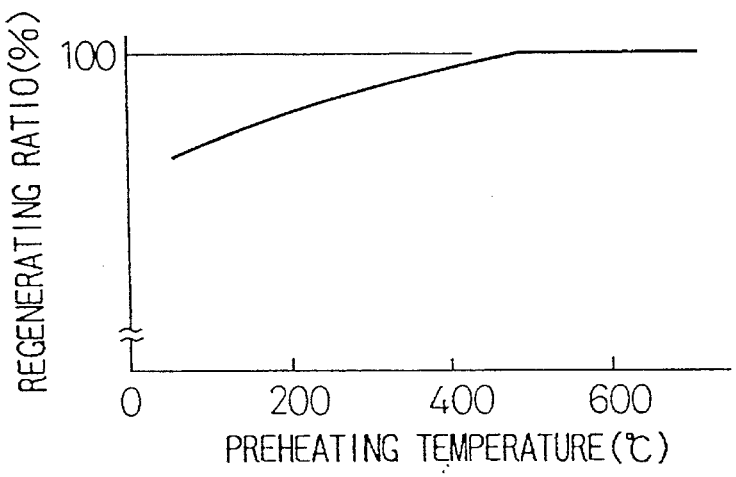
Figure 11:
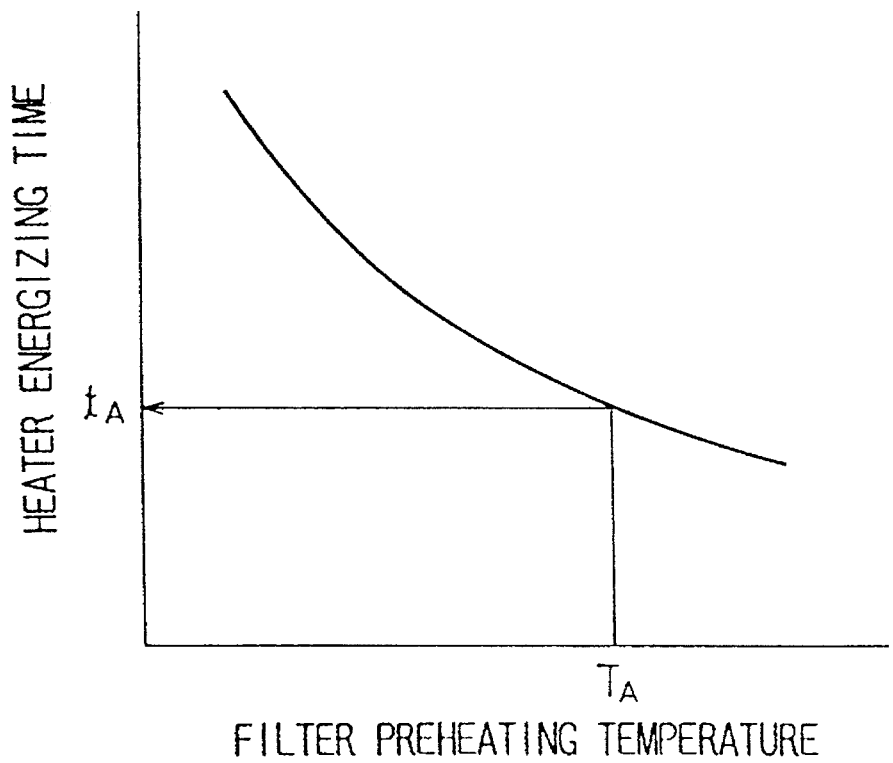
FIG. 11 is a graph showing a relation between a filter preheating temperature and an appropriate heater energizing time.

In this case, the filter preheating temperature is greatly changed by the operating conditions as described above. Whereas the temperature increasing rate of the electric heater 21 is greatly changed by this preheating temperature, the filter preheating temperature is detected by the temperature sensor 22, and the obtained output signal is inputted into the control unit 13. An electric current amount corresponding to the filter preheating temperature is supplied to the electric heater 21 under the control of the current amount control means 17. As described before referring to FIG. 6, when a current amount is kept constant, the higher the filter preheating temperature is, the higher the temperature of a portion close to the heater is raised immediately before the completion of current supply. Accordingly, in the case where the filter preheating temperature is high, in order to prevent the filter from being damaged by the heat generated by an excessive current supply, the heater energizing time may be shortened in accordance with a map showing the relation between the filter preheating temperature $T_A$ and the appropriate heater energizing time $t_A$ as shown in FIG. 11.

Figure 12:
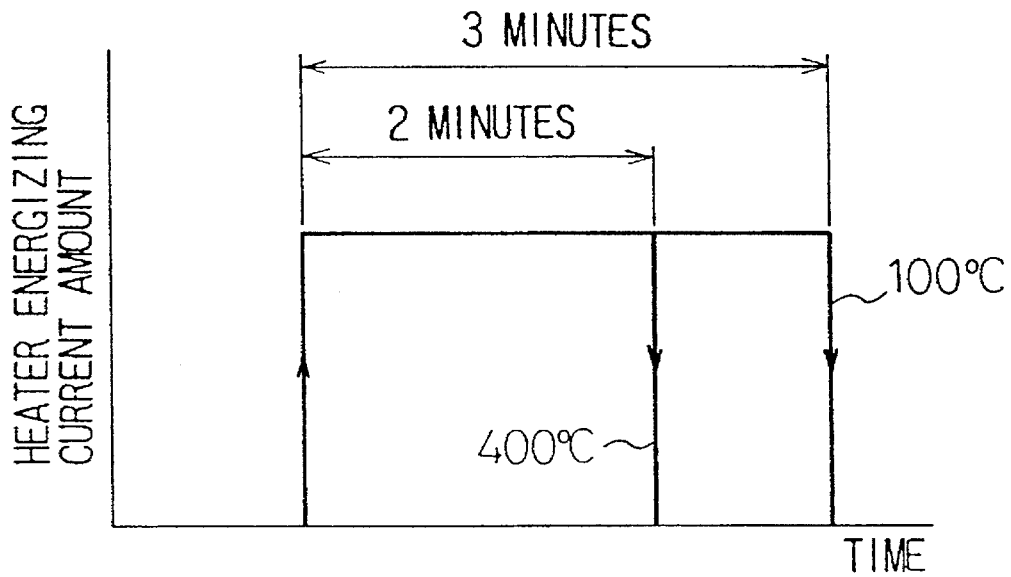
FIG. 12 is a graph showing an example of the heater energizing time control operation conducted in accordance with the filter preheating temperature in the first example.
Figure 13:
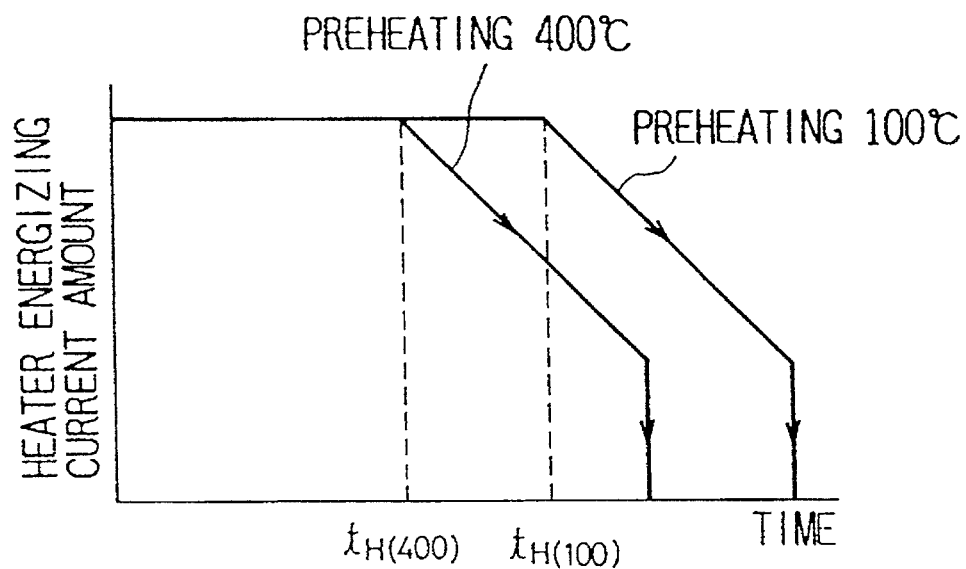
FIG. 13 is a graph specifically exemplifying a control procedure in the case where consideration is given to the filter preheating temperature in the first example.

For example, as shown in FIG. 12, the controlling operation is conducted in the following manner:

In the case where it is necessary to energize the electric heater with current for 3 minutes at a preheating temperature of 100° C. so as to ignite the accumulated particulates, the heater energizing time is reduced to 2 minutes when the preheating temperature is 400° C.

In this case, the electric current amount is adjusted by controlling the energizing time, however, the electric current amount may be adjusted by controlling the electric power to be supplied to the heater.

Consequently, in a controlling operation in which the electric current amount is gradually reduced after the completion time $t_H$ of supplying a current to the heater, it is necessary to change the electric current energizing time $t_H$ required for ignition in accordance with the filter preheating temperature.

Figure 14:
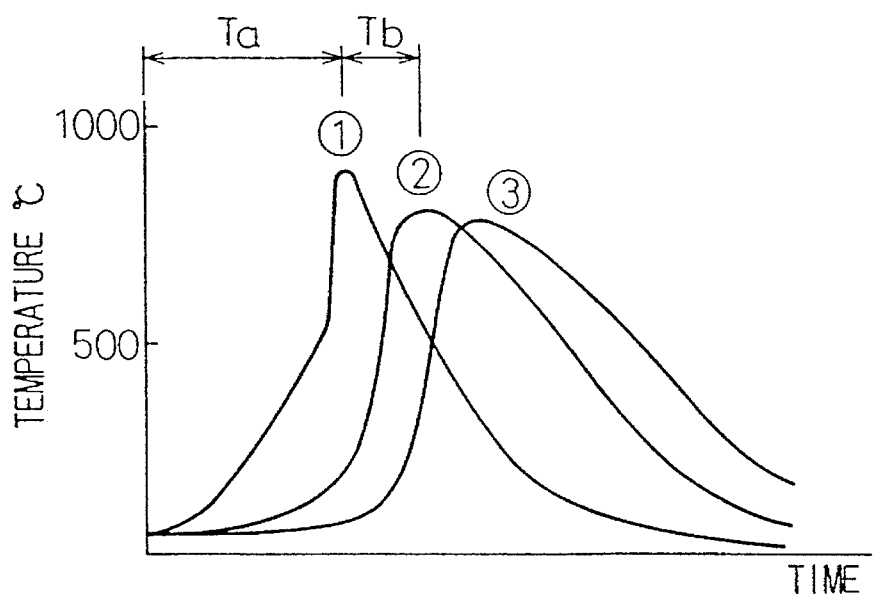
FIG. 14 is a graph showing changes in temperature at different positions separately located from a heater end surface at a heating temperature of 60° C.
Figure 15:
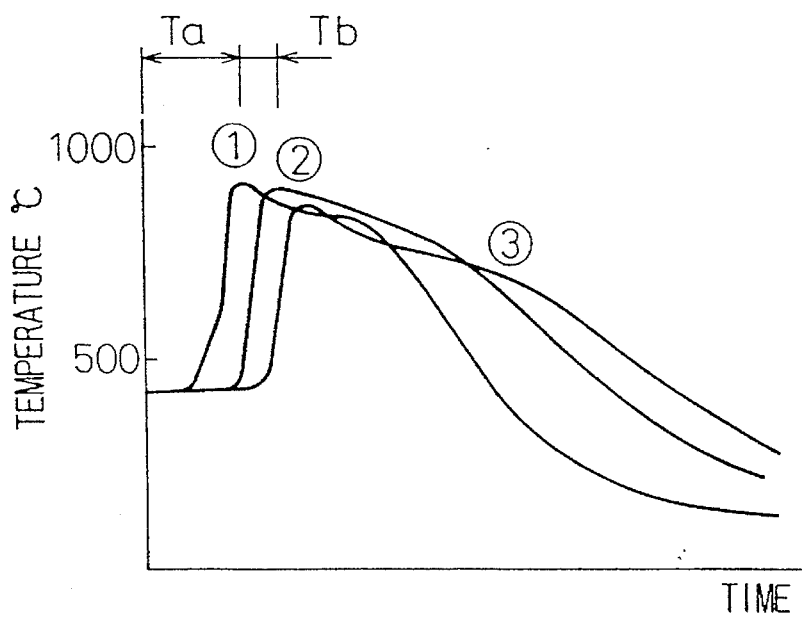
FIG. 15 is the same graph as that of FIG. 14, wherein the preheating temperature is set at 400° C.
Figure 16:
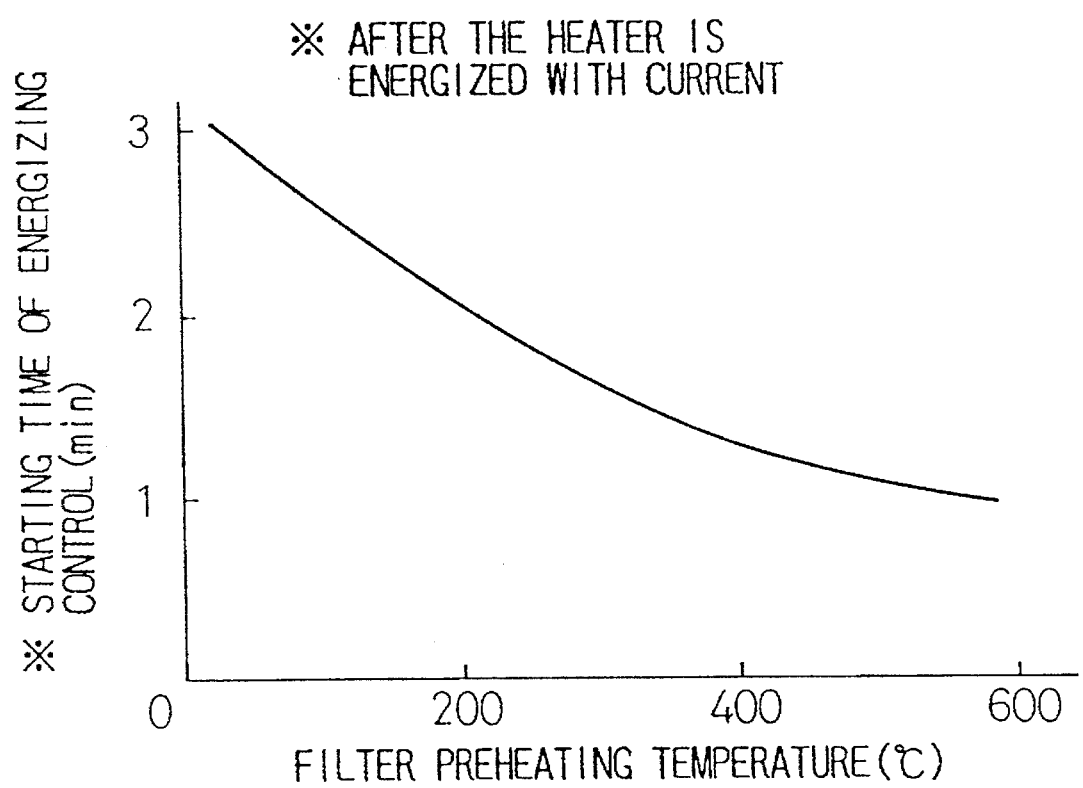
FIG. 16 is a characteristic function graph in which a model of the relation between a filter preheating temperature and an energizing control starting time is shown.

Whereas a portion of the filter separated from the front surface by 30 to 50 mm tends to be cracked, a controlling operation to energize the heater with current may be started at a point of time when the combustion region has reached this portion of the filter. According to an experiment made by the inventors, when the filter preheating temperature was high, the igniting and burning speed was also high, that is, as illustrated in FIGS. 14, 15, in the case where the preheating temperature is 400° C. (shown in FIG. 15), the period of time Ta is short in which the temperature of a portion separate from the heater surface by 30 mm becomes a peak value, and the period of time Tb in which the temperature of a portion separate from the aforesaid portion by 65 mm becomes a peak value is shorter than that of a case (the example shown in FIG. 14) in which a regenerating processing operation is conducted at a preheating temperature of 60° C. Accordingly, it is necessary to change a time to start the electric current controlling operation in accordance with the preheating temperature. FIG. 16 is a view showing one of the examples.

Figure 17:
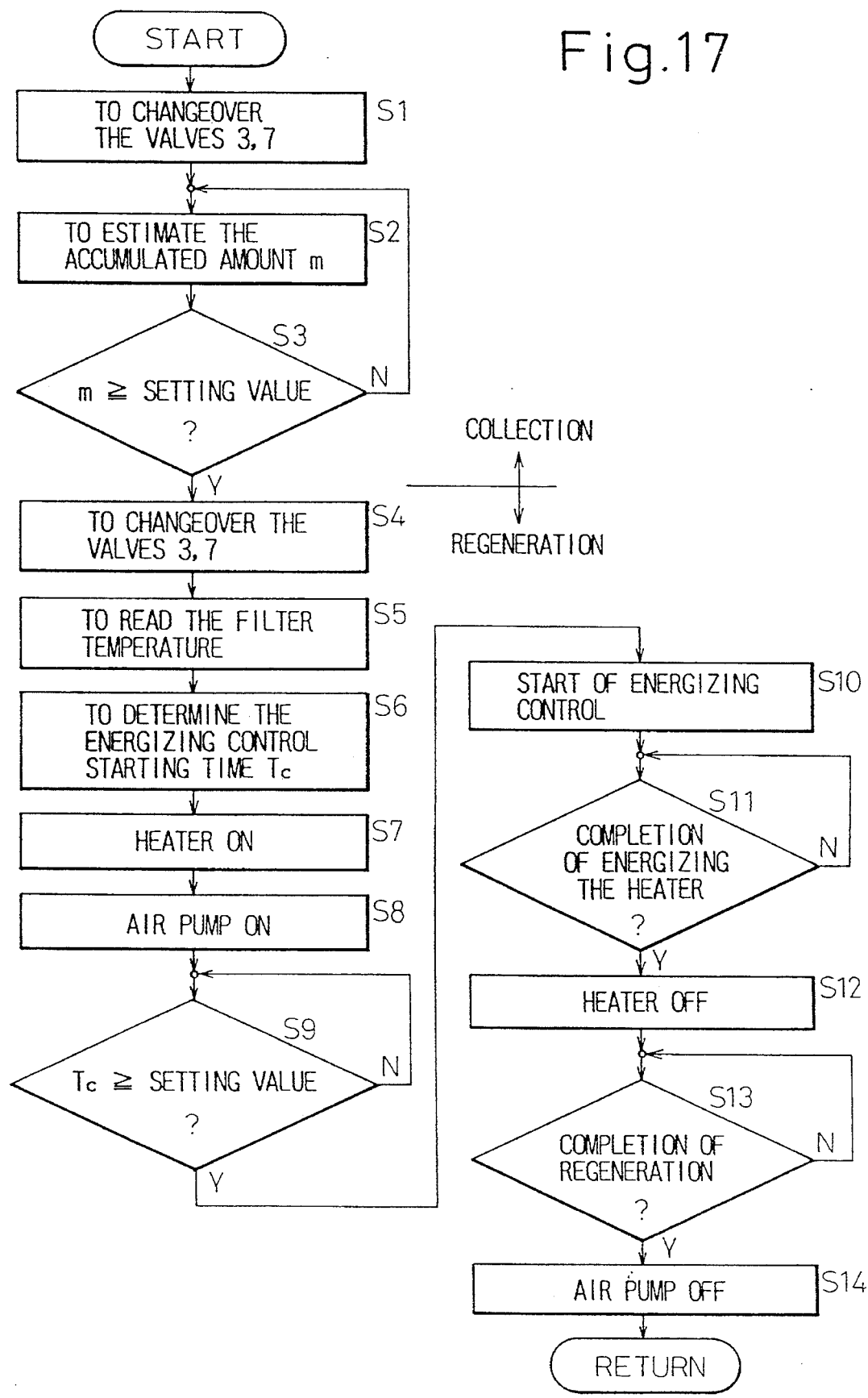
FIG. 17 is a flow chart showing a procedure of the collecting and regenerating processing operations in the first embodiment of the present invention.

FIG. 17 is a flow chart showing an operation of the apparatus of the present invention. In step 1 (S1), the changeover valves 3, 7 are changed over to positions opposite to those shown in FIG. 9, so that all exhaust gas is introduced to the filter. In step 2 (S2), the accumulated particulate amount m is estimated from the pressure difference ΔP of the filter. When this value exceeds a set value in step 3 (S3), the changeover valves 3, 7 are changed over to the positions shown in FIG. 9 in step 4 (S4) so as to start a regeneration processing operation. Next, in step 5 (S5), the filter preheating temperature is read in. In step 6 (S6), the time Tc to start an electric current control operation is determined in accordance with the filter preheating temperature using a map shown in FIG. 16.

Next, in step 7 (S7), the heater is energized with current, and in step 8 (S8), the necessary amount of air for combustion is supplied by the air pump. When Tc exceeds a setting value in step 9 (S9), the program advances to step 10 (S10) and an electric current controlling operation is started. In step 11 (S11), it is judged whether or not it is a time to cease supplying a current to the heater. In the case of NO, the step 11 is repeated, and in the case of YES, the program advances to step 12 (S12) and the heater is turned off. After that, in step 13 (S13), it is judged from the heating time whether or not the regenerating processing operation has finished. In the case of NO, the step 13 is repeated, and in the case of YES, the program advances to step 14 (S14), the air pump is stopped, and the collecting operation is started again.

Figure 18:
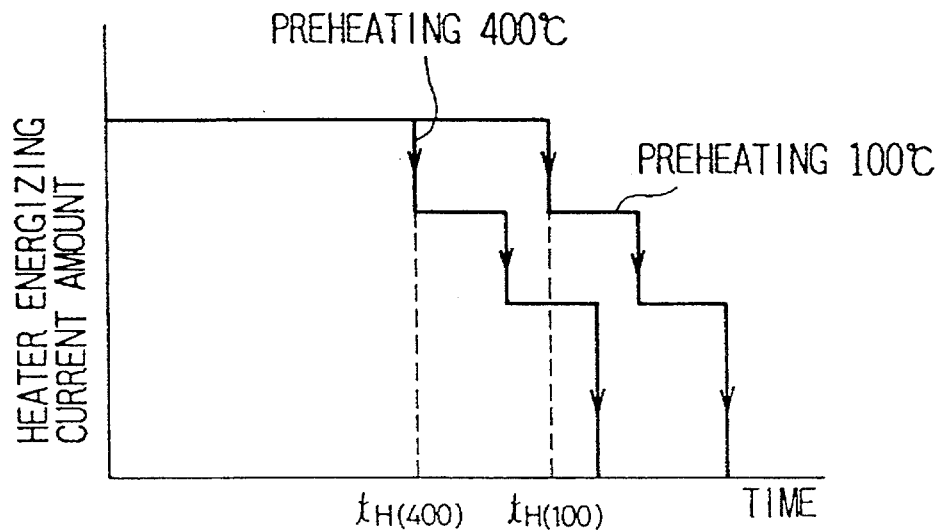
FIG. 18 is a graph specifically exemplifying the control procedure in the second embodiment of the first example of the present invention.

FIG. 18 is a view showing another embodiment in a specific example. In this embodiment, after the electric current energizing time $t_H$ necessary for ignition has elapsed, the electric current is reduced stepwise. Also, in this case, the electric current energizing time $t_H$ necessary for ignition is changed in accordance with the filter preheating temperature. In the case where the electric current amount is reduced stepwise, it is effective to reduce the current amount at intervals of 30 seconds.

Figure 19:
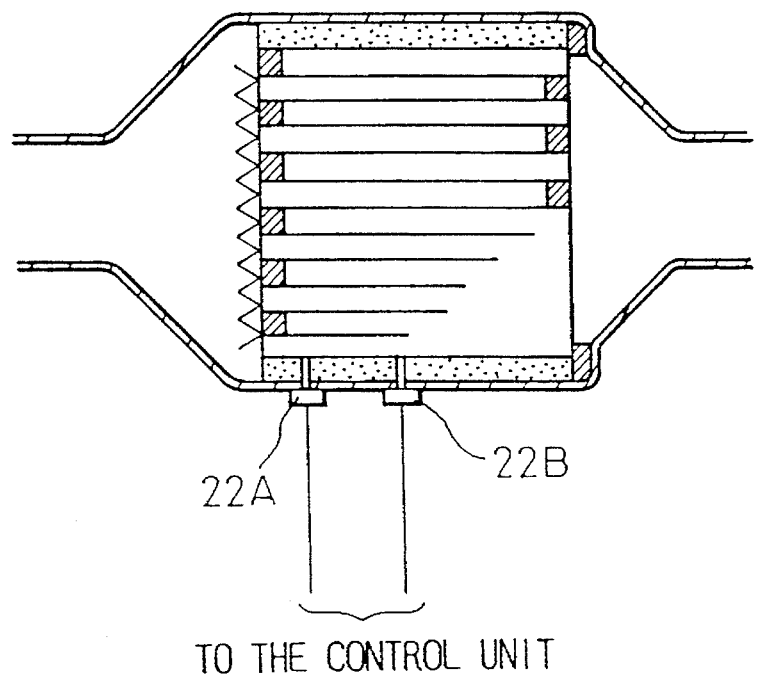
FIG. 19 is an arrangement view showing the third embodiment of the first example of the present invention.

FIG. 19 is a view showing another embodiment of the apparatus of the present invention. In this embodiment, two temperature sensors 22A, 22B are provided, that is, the temperature sensor 22A is disposed close to the heater, and also the temperature sensor 22B is disposed on the outer circumference close to the center of the filter. An electric current supplied to the heater 21 is controlled so that a difference between the temperatures $T_1$ and $T_2$ detected by the sensors 22A, 22B can be limited into a predetermined temperature range. As shown in FIG. 20, in the case where the aforesaid control operation is not conducted, the temperature falls as shown by a broken line in FIG. 20(A). On the other hand, in the present example, the temperature falls as shown by a solid line of $T_2$. As a result of the foregoing, even when the combustion condition is changed, for example, even when the combustion speed is increased, a temperature gradient between a portion close to the heater and a combustion region located in the downstream can be lowered, so that the occurrence of thermal damage can be prevented.

In order to reduce the temperature gradient and ease the stress when the regenerating process is carried out, as is well known, it is useful to preheat the filter before and after the heater is energized with current. The inventors confirmed that a portion of the filter located at a position close to the heater was cracked due to a temperature gradient obtained just after when an electric current supply to the heater, had been stopped. Therefore, the inventors found that it is useful that the filter may be preheated only after the heater is energized with current.

Consequently, according to the specific example of the present invention, when the electric current supplied to the electric heater disposed on an end surface of the filter is gradually reduced in the case of a regenerating processing operation of the filter to collect particulates, a portion of the filter close to the heater is prevented from being suddenly cooled, and when a temperature gradient between the cooled portion and the combustion region is small, the occurrence of damage can be prevented. Further, even when the filter preheating temperature is varied, the temperature of the filter is not excessively raised, and electric power can be saved.

Example 2

Next, as the second embodiment of the present invention, Example 2 will be explained as follows.

The second embodiment of the present invention is constructed in the aforesaid manner.

As the accumulated particulate amount collected by the filter 20 increases, the pressure difference ΔP, between the pressure before and that after the filter 20, detected by the pressure difference meter 23 increases. Therefore, it is possible to determine the accumulated particulate amount from the value of ΔP.

On the other hand, the filter preheating temperature is detected from a signal sent from the temperature sensor 22 attached to the filter 20. When the relationship between the detected preheating temperature and the accumulated particulate amount is in a range shown in FIG. 8, the filter can be regenerated to an excellent condition. When it is judged that the relationship is in this range, the aforesaid regenerating processing operation is carried out.

As shown in FIG. 21, assuming that the amount of the accumulated particulate, measured by utilizing the pressure difference ΔP formed between the pressures detected both on a front and a back surfaces of the filter 20, is mp, and also when the filter preheating temperature at which the filter can be excellently regenerated with this accumulated particulate amount, is $T_{G1}$ to $T_{G2}$, when the engine is driven, for example at high speed with heavy loading, the temperature in the filter is gradually raised and finally reaches $T_p$. However, according to the present invention, when the temperature has reached a value between $T_{G1}$ and $T_{G2}$, the filter is subjected to the regenerating processing.

When the regenerating processing operation is carried out, the control unit 13 outputs control signals to the actuators 14, 15, so that the changeover valves 3, 7 are changed over to the positions shown in FIG. 9. As a result of the foregoing, the exhaust gas discharged from the engine is directly guided into the exhaust pipe 8 from the exhaust pipe 2 through the bypass 9, and vented to the atmosphere.

The control unit 13 also outputs a control signal to the relay 17 which is an energizing control means, and an electric current is supplied to the electric heater 21 from a battery not shown in the drawings. Further, immediately after that, a control signal is also outputted into the air flow amount control unit 16. Due to the foregoing, the air pump 12 is driven and a gas for regenerating, such as air, is supplied in a direction indicated by an arrow in FIG. 9. In this connection, in the example illustrated in FIG. 9, the direction of an exhaust gas flow in the case of regenerating the filter 20 is opposite to that in the case where particulates are collected in a normal operation. Even in this case, the heat generated by the electric heater 21 can be conveyed by an air flow and supplied to the particulates accumulated in the filter 20 from the upstream side.

The particulates are heated by the electric heater 21, and their temperature is raised to an ignition temperature of 650° C., wherein the particulates accumulated on the upstream side are heated and burnt first and then the particulates accumulated on the downstream side are successively heated and burnt. The combustion gas is vented to the atmosphere through another exhaust pipe 10. In this way, the particulates accumulated in the filter 20 are gradually incinerated and removed.

In this example, an amount of particulates accumulated in the filter is estimated by the pressure difference ΔP between before and after the filter. However, it is a matter of course that the particulate amount can be estimated from an integrated value of the engine revolutions, a fuel consumption amount, or a combination of them.

Figure 8:
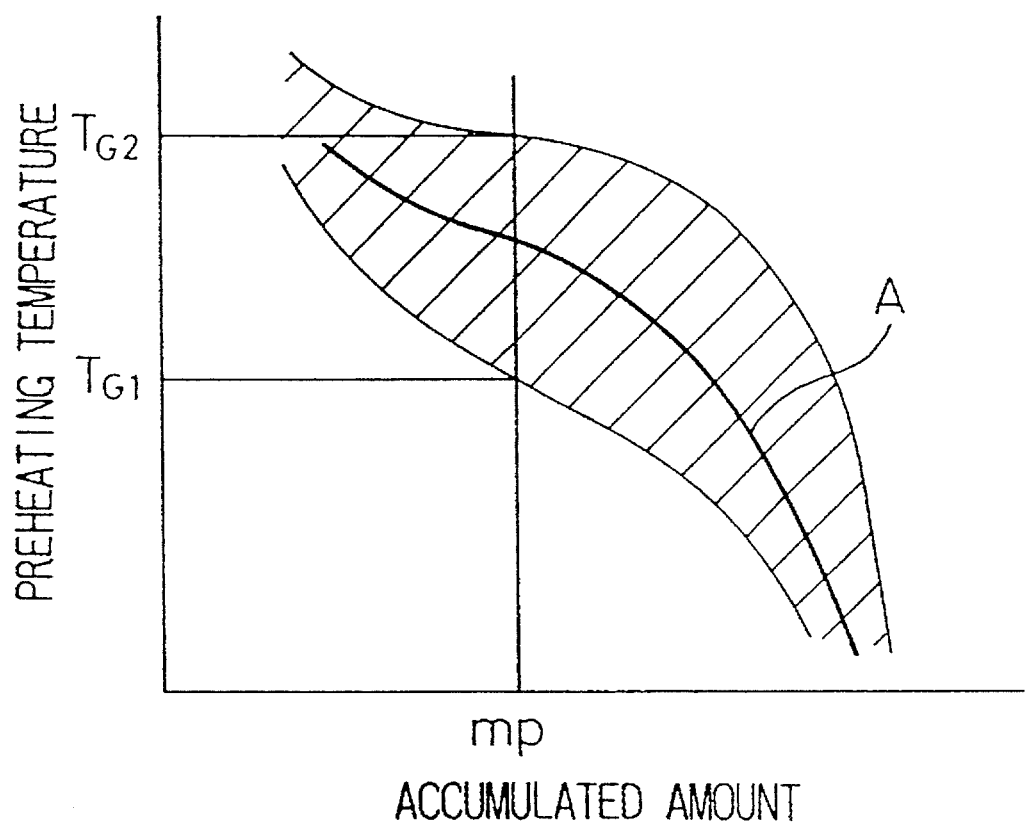
FIG. 8 is a graph exemplifying a range in which an excellent regenerating processing operation can be performed with respect to an accumulated particulate amount and preheating temperature.

Concerning a condition in which the regenerating processing is conducted, when the condition is determined to be a curve A shown in FIG. 8 located in the middle of a range in which the filter can be excellently regenerated, an excellent regenerating operation can be carried out even if a detection error is produced in the accumulated particulate amount.

Figure 22:
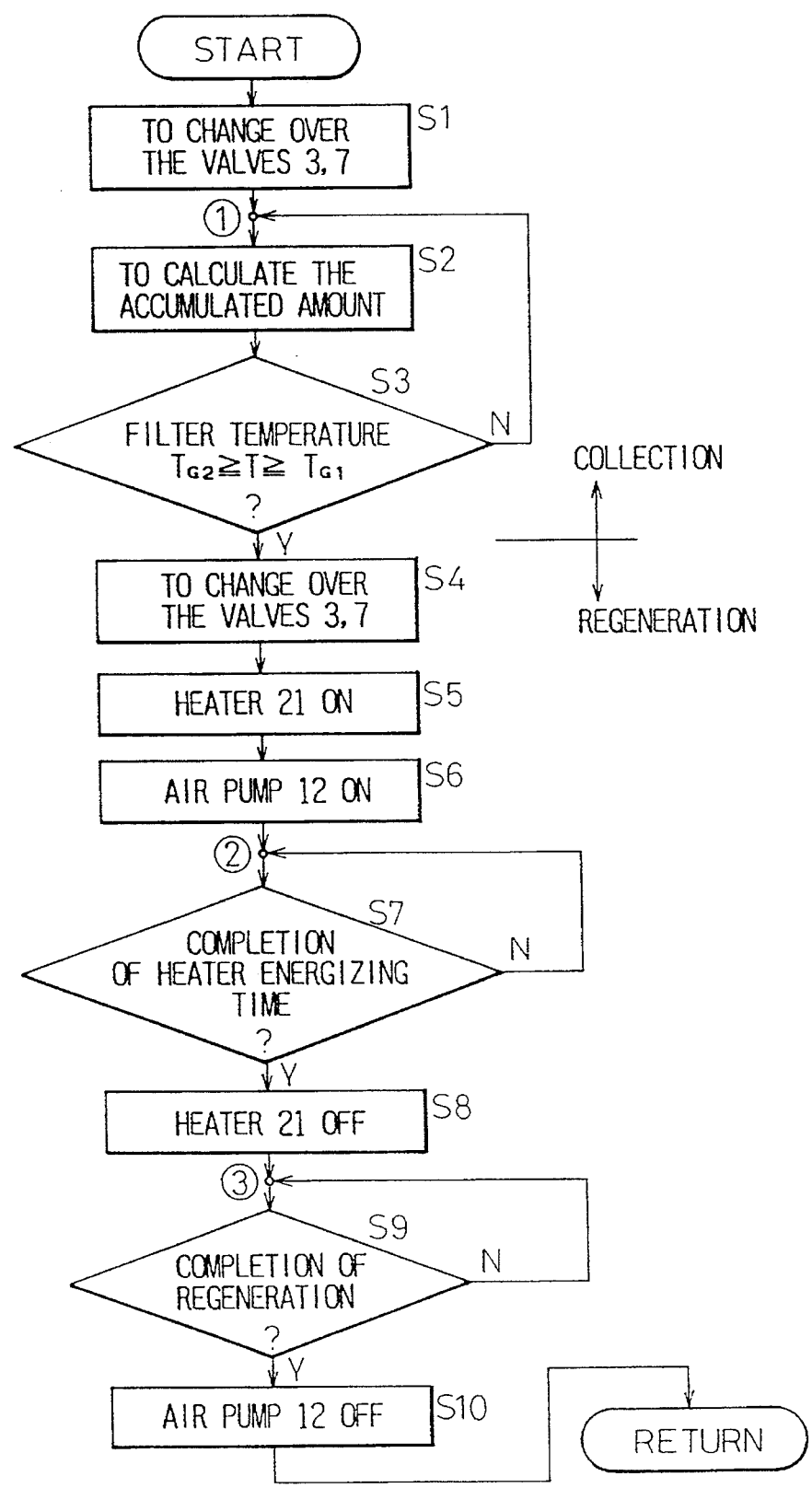
FIG. 22 is a flow chart showing the procedures of particulate collection and regenerating processing operation in the second example of the present invention.

With reference to FIG. 22, a regenerating procedure of this example will be explained as follows. In step 1 (S1), the changeover valves 3, 7 are changed over to the positions opposite to those shown in FIG. 9, so that exhaust gas is introduced to the filter 20 and particulates are collected. In step 2 (S2), the momentarily accumulated particulate amount mp is found from a value detected by the filter difference pressure detection means 23. In step 3 (S3), it is judged whether or not the filter temperature T detected by the temperature measuring means 22 is in a preheating temperature range of $T_{G1}$ to $T_{G2}$ shown in FIG. 8 in which the filter 20 is regenerated in an excellent condition. In the case where the filter temperature T is out of the range, that is, in the case of NO, the program returns to (1) and the particulate collecting operation is continued. In the case where the filter temperature T is in the range, that is, in the case of YES, the program advances to step 4 (S4), and the changeover valves 3, 7 are changed over for conducting a regenerating operation so that the valves are set into the condition shown in FIG. 9. Therefore, all exhaust gas flows through the bypass. In step 5 (S5), the heater 21 is energized with current, and in step 6 (S6), the air pump is turned on so as to supply air necessary for combustion. Next, in step 7 (S7), it is judged whether or not a predetermined heater energizing time has passed, and in the case of YES, the program advances to step 8 (S8), and the heater is turned off, and in the case of NO, the program advances to the next step 9 (S9).

In step 9 (S9), it is judged from the time whether or not the regenerating processing has been completed. In the case of NO, the program returns to (2), and in the case of YES, that is, in the case where the regenerating processing has been completed, the program advances to step 10 (S10), and the air pump 12 is turned off, and the program returns to the particulate collecting operation, that is, START.

Figure 23:
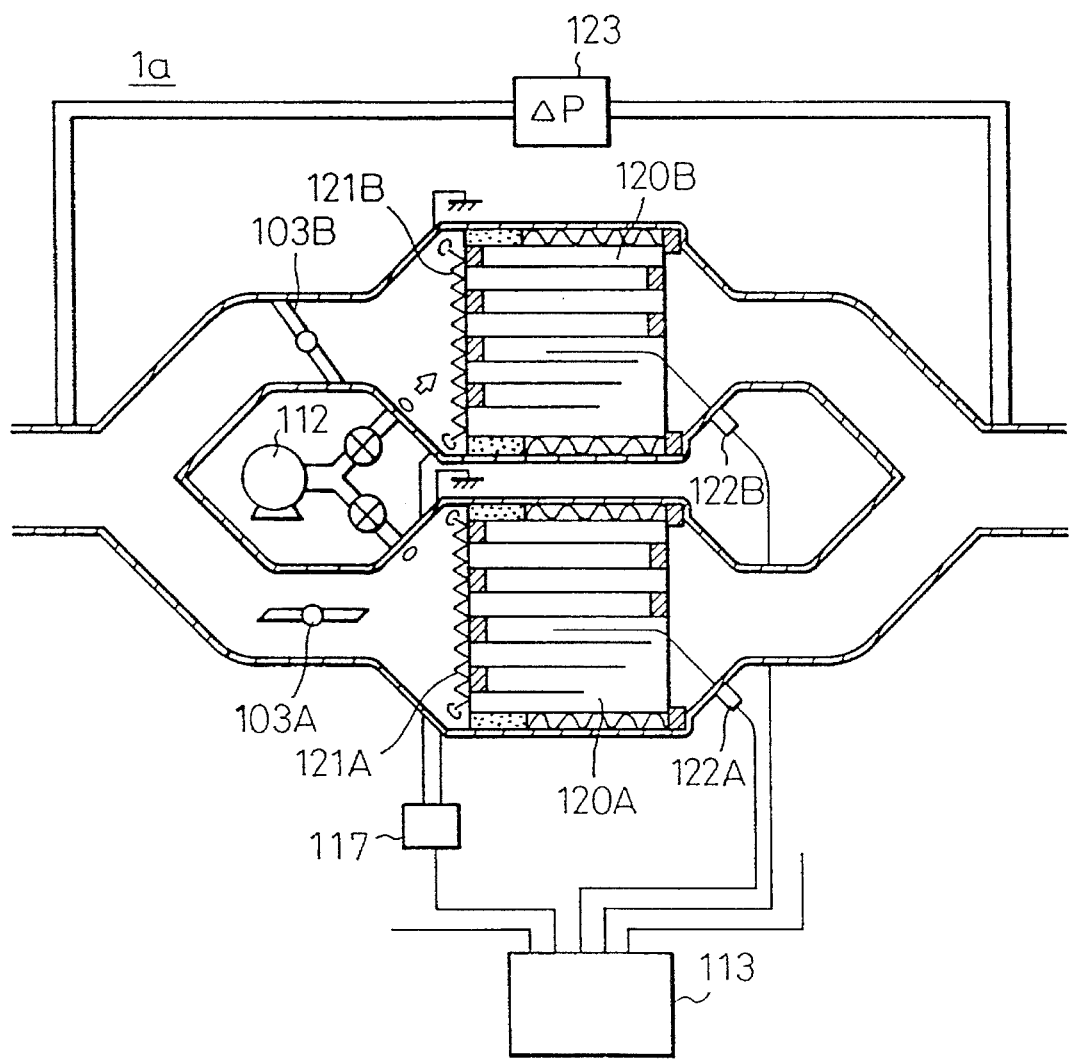
FIG. 23 is an overall arrangement view including a partially sectional view showing another embodiment of the second example of the present invention.
Figure 24:
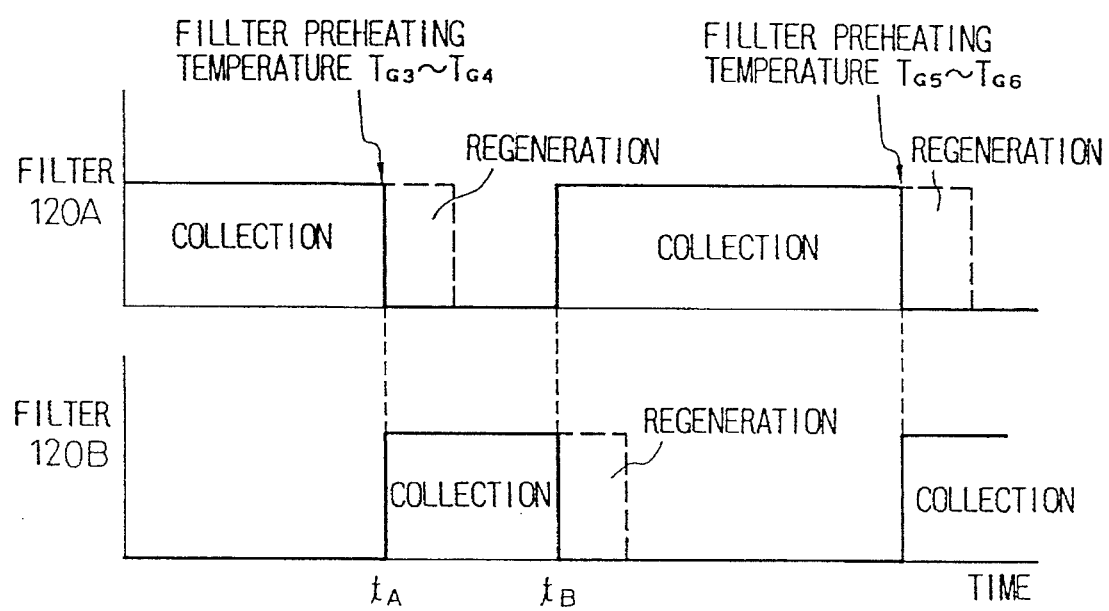
FIG. 24 is a diagram specifically exemplifying an operation of the second example.

FIG. 23 is a view showing an exhaust gas particulate purifying apparatus 1a of another example of the second embodiment of the present invention. In this example, in order to prevent the exhaust gas containing particulates from being discharged outside during the regenerating processing, filters 120A and 120B are provided in the apparatus. The filters 120A and 120B are provided with temperature measuring means 122A and 122B, and heaters 121A and 121B. Opening and closing valves 103A and 103B are provided in the passages located on the upstream side of the filter. An air pump 112 is provided for supplying air used for regeneration to both filters. In this construction, first, only the valve 103A is opened as illustrated in the drawing, so that particulates are collected only by the filter 120A. In the same manner as the aforesaid example, after the accumulated particulate amount has reached $m_A$, in the case where the preheating temperature of the filter 120A detected by the temperature measuring means 122A is in a range of $T_{G3}$ to $T_{G4}$ in which the filter 120A can be excellently regenerated with respect to the accumulated particulate amount $m_A$, the valve 103B is opened and the valve 103A is closed, and the heater 121A is energized with current, and at the same time, necessary air for regeneration is supplied by the air pump 112. At this time, all exhaust gas is introduced to the filter 120B, and a particulate collecting operation is started by the filter 120B. In the same manner, when an accumulated particulate amount of the filter 120B is $m_B$, and also when the filter preheating temperature is in a range of $T_{G5}$ to $T_{G6}$ in which the filter can be excellently regenerated, the valve 103A is opened and the valve 103B is closed so as to regenerate the filter 120B. The series of operations are repeatedly conducted. These operations are shown in FIG. 24. In this case, first, particulates are collected only by the filter 120A. When an accumulated particulate amount is $m_A$ and the filter preheating temperature is in a range of $T_{G3}$ to $T_{G4}$ after a period of time $t_A$ has passed, a particulate collecting operation is started by the filter 120B, and the filter 120A is subjected to regenerating processing. After that, the particulate collecting operation conducted by the filter 120B makes progress. When an accumulated particulate amount is $m_B$ and the filter preheating temperature is in a range of $T_{G5}$ to $T_{G6}$ after a period of time $t_B$ has passed, the filter 120A starts the particulate collecting operation again, and at the same time, the filter 120B is subjected to a regenerating processing. In the same manner, the operations are repeated.

In this case, the particulate collecting operation is conducted only by one filter, so that the pressure loss is increased as compared with a case in which two filters are used. For this reason, there is a possibility that the engine output is lowered. However, only when a vehicle runs uphill at high speed, that is, only when the engine is driven at high speed under a heavy load, is the output of the engine deteriorated.

Under the aforesaid condition, the filter preheating temperature is raised. Accordingly, there is a high possibility that the regenerating processing is conducted with a small amount of accumulated particulates. Consequently, particulates are collected by a filter of low pressure loss in which a small amount of particulates are accumulated. Therefore, the output of the engine is less deteriorated, and in some cases, the output of the engine is superior to that of a case in which the two filters have already collected a certain amount of particulates.

According to the present invention, when the filter is subjected to the regenerating processing under the conditions of a relatively large amount of accumulated particulates and a high filter preheating temperature, the occurrence of thermal damage such as cracks can be prevented, and the filter can be excellently regenerated. Further, when the filter is subjected to the regenerating processing under the condition of a relatively small amount of accumulated particulates, a reduction in engine output can be avoided.

We claim:

1. An exhaust gas particulate purifying method for an exhaust gas particulate purifying apparatus comprising: a filter provided in an exhaust gas system in an internal combustion engine so as to collect particulates contained in exhaust gas; an electric heater provided on an end surface of said filter or in a position close to said end surface, said end surface being located on an upstream side of said filter with respect to a flowing direction of regenerating gas in a regenerating process; a temperature measuring means provided inside said filter or close to an end surface of said filter; a control means for determining an appropriate amount of current to be supplied to said electric heater and also for determining an electric power reduction pattern in the case of stoppage of power supply, in accordance With the filter preheating temperature detected by said temperature measuring means; and a current amount control means for controlling the current sent to said electric heater in accordance with a command from said control means is employed, said exhaust gas particulate purifying method comprising the steps of:

estimating an accumulated exhaust gas particulate amount by either directly measuring the thickness of an accumulated exhaust gas particulate layer on the front surface of the filter or by measuring a difference of pressure between the front and rear of said filter;

determining whether or not the accumulated exhaust gas particulate amount exceeds a predetermined value;

changing over an exhaust gas passage by shutting off a normal exhaust gas flow in the exhaust gas system and allowing the gas for regeneration to flow in a direction opposite to that of a normal exhaust gas flow in the case where it is determined that said estimated amount has exceeded said predetermined value;

measuring said preheating temperature of said filter;

selecting a current supply controlling pattern by which said electric heater is energized with current in accordance with the measured preheating temperature of said filter, said electric heater being connected with said filter or positioned close to said filter;

supplying an electric current to said heater and also supplying air for regeneration to a regenerating processing region after the current supply controlling pattern has been determined;

detecting a time of the completion of current supply which is set by said current supply controlling pattern; and stopping the current supply to said electric heater in the case where the time of the completion of current supply has been detected.

2. The exhaust gas particulate purifying method according to claim 1, wherein an amount of current supplied to said electric heater is gradually reduced in the case where the time of the completion of current supply has been detected.

3. The exhaust gas particulate purifying method according to claim 1, wherein the thickness of an accumulated exhaust gas particulate layer on the front surface of said filter is directly measured, and the regenerating processing is started when the thickness of the accumulated exhaust gas particulate layer has reached 30 to 50 mm.

* * * * *